United States Patent
Rogge et al.

(10) Patent No.: US 8,434,749 B2
(45) Date of Patent: May 7, 2013

(54) BODY MOUNT ASSEMBLY

(75) Inventors: Timothy A. Rogge, Whitmore Lake, MI (US); Neil Stewart Cummings, Ann Arbor, MI (US); Mickey L. Love, Londonderry, NH (US); Robert James Ramm, Amherst, NH (US)

(73) Assignee: Vibracoustic North America, L.P., Plymouth, MI (US)

( * ) Notice: Subject to any disclaimer, the term of this patent is extended or adjusted under 35 U.S.C. 154(b) by 1982 days.

(21) Appl. No.: 11/433,914

(22) Filed: May 12, 2006

(65) Prior Publication Data
US 2007/0262503 A1  Nov. 15, 2007

(51) Int. Cl.
*B60G 11/22* (2006.01)

(52) U.S. Cl.
USPC ............ 267/293; 267/269; 267/281; 384/222

(58) Field of Classification Search ............... 267/293, 267/292, 141.2, 141.1, 141, 281, 269, 270; 384/215, 220, 221, 222, 275, 296; 403/368, 403/369, 223, 224, 225
See application file for complete search history.

(56) References Cited

U.S. PATENT DOCUMENTS

| | | | | |
|---|---|---|---|---|
| 3,147,964 A | * | 9/1964 | Wolf | 267/292 |
| 3,584,857 A | * | 6/1971 | Hipsher | 267/281 |
| 4,139,246 A | * | 2/1979 | Mikoshiba et al. | 384/222 |
| 4,720,075 A | * | 1/1988 | Peterson et al. | 248/635 |
| 4,749,174 A | * | 6/1988 | Kanda | 267/140.12 |
| 4,817,926 A | * | 4/1989 | Schwerdt | 267/140.12 |
| 4,921,203 A | * | 5/1990 | Peterson et al. | 248/635 |
| 5,295,671 A | | 3/1994 | Nakagaki et al. | |
| 5,799,930 A | | 9/1998 | Willett | |
| 5,820,115 A | * | 10/1998 | Stevenson et al. | 267/293 |
| 5,941,511 A | * | 8/1999 | Dawda et al. | 267/140.12 |
| 6,364,296 B1 | | 4/2002 | Cummings et al. | |
| 6,416,030 B1 | * | 7/2002 | Bergdahl et al. | 248/635 |
| 6,419,215 B1 | | 7/2002 | Johnson et al. | |
| 6,471,179 B1 | | 10/2002 | Tousi et al. | |
| 6,540,216 B2 | | 4/2003 | Tousi et al. | |
| 6,820,908 B1 | | 11/2004 | Tousi et al. | |
| 7,445,201 B2 | * | 11/2008 | Endo | 267/141 |

* cited by examiner

*Primary Examiner* — Robert A Siconolfi
*Assistant Examiner* — Mariano Sy
(74) *Attorney, Agent, or Firm* — Daniel J. Sepanik, Esq.; Harness, Dickey & Pierce, P.L.C.

(57) ABSTRACT

A body mount for use in motor vehicles in which the mount is sandwiched between the subframe and body. The mount has an insert member with an oblong shape in the lateral displacement direction of the vehicle. The insert member is surrounded by a microcellular urethane body. The oblong shape increases the compression of the microcellular urethane body that can be used to respond to lateral forces. The lateral response rate can be stiffer than the fore and aft response rate. The isolation mount also can facilitate fine tuning thereof by selectively indenting a cup member surrounding the microcellular urethane body to adjust the vibration characteristics of the body mount.

18 Claims, 6 Drawing Sheets

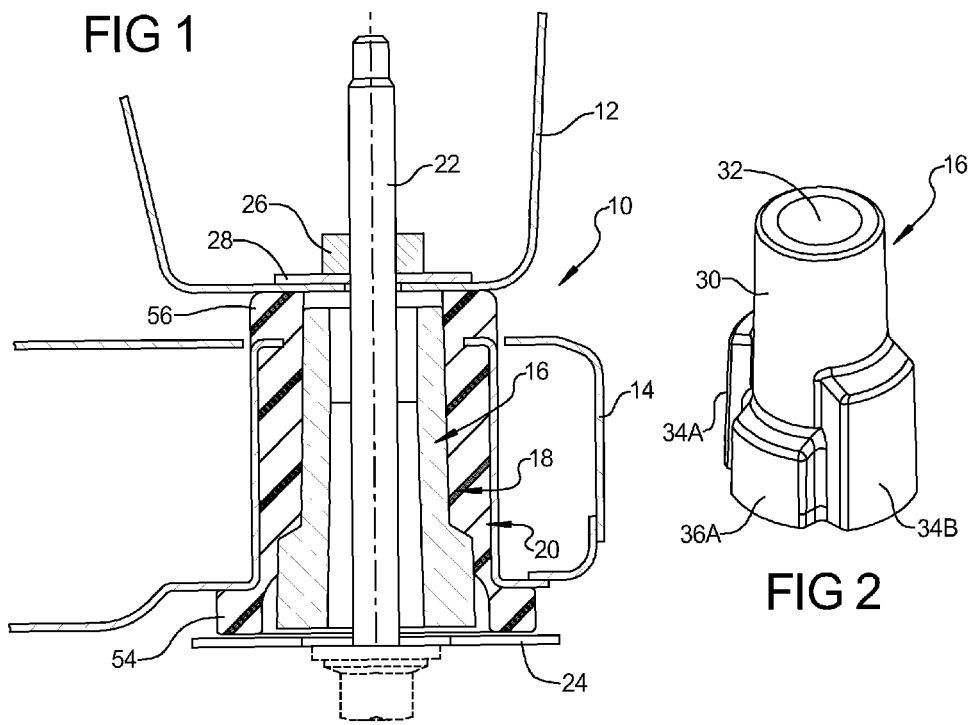
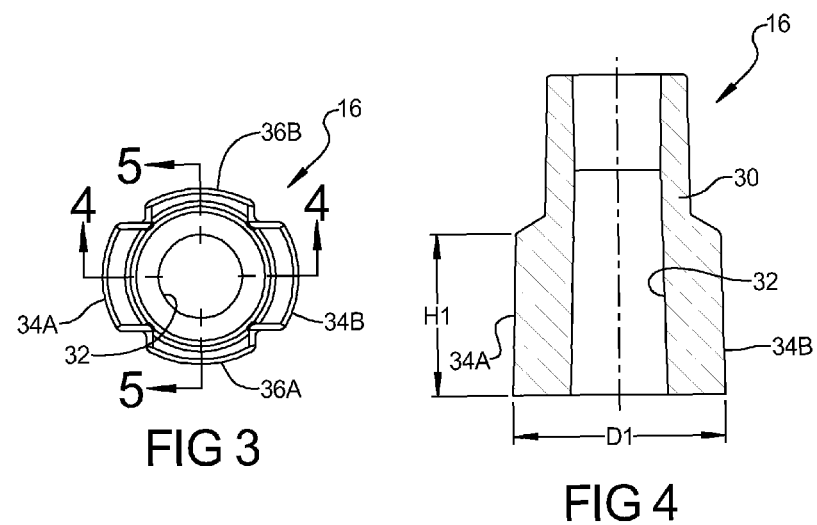

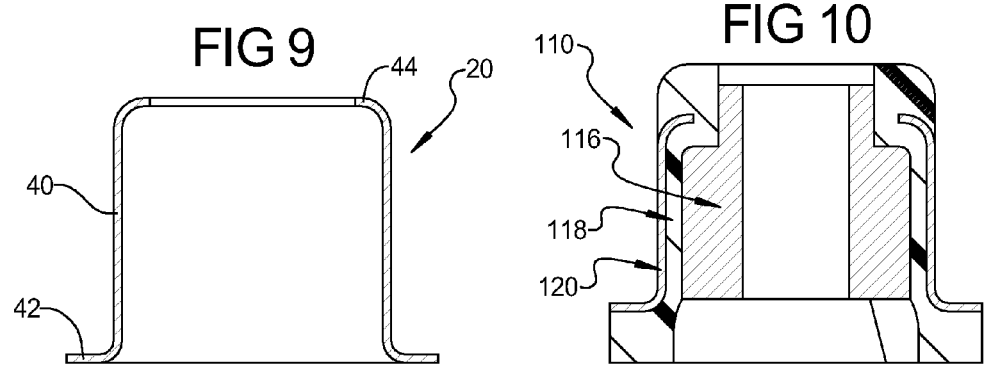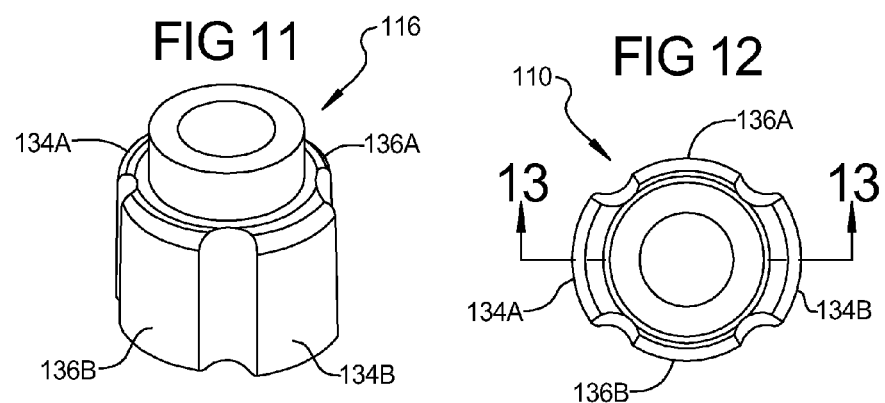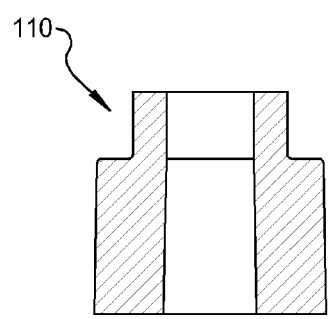

BODY MOUNT ASSEMBLY

FIELD

The present disclosure relates to an isolation mount used in securing a support structure to a vehicle body, such as a vehicle cradle mount or subframe, and for absorbing vibrations and movements between the two structures.

BACKGROUND

The statements in this section merely provide background information related to the present disclosure and may not constitute prior art.

Subframe mounts are used extensively in unibody vehicles to isolate vibrations created by road inputs from being transmitted from the engine to the subframe and the body, and vice versa. The operator of the vehicle perceives that vibration isolation relates to ride quality and that improved vehicle dynamics translates into improved handling performance.

Typically, there are as many as four locations on the subframe where an isolation mount is utilized. The sub-frame is compressed between the upper portion and the lower portion of the vibration mount and the vehicle body rests on top of the upper mount. A bolt extends through an aperture in the sub-frame and the isolation mount. The lower mount and the upper mount are connected by a weld nut on the body to complete the attachment, of the body to the sub-frame. The mount isolates road inputs and engine or transmission induced vibration that is transmitted along the sub-frame to the body. The mount also improves vehicle dynamics by controlling or attenuating relative movement between the vehicle body and sub-frame in the vertical mode or plane, that is up and down, relative movement, and also to control lateral mode or plane, that is side to side movement, and fore and aft mode or plane, that is front to back relative movement.

A typical design of a sub-frame isolation mount employs a relatively hard or high durometer rubber (typically 40 to 80 Shore A) as an isolating material. High durometer rubber for cradle or sub-frame mounts is an excellent material for improved handling in the lateral plane, especially when it is combined with rate plates to stiffen the response in the lateral plane and to a limited degree the fore and aft plane. However, since the solid elastomeric material is generally very stiff, it does not attenuate vertical forces from the subframe to the body very effectively. As a result, the isolation mount has a high lateral stiffness rate response which is desirable but it has a fore aft stiffness rate response which is marginally acceptable and a vertical stiffness rate response which is low. Therefore, good ride and handling of a vehicle are compromised because of the stiffness properties of the solid elastomeric material.

Thus, there is a need for a vibration isolation mount that provides for ride quality that is satisfactory to the operator without sacrificing the handling characteristics of the vehicle in the lateral plane, fore and aft plane and vertical plane. Additionally, there is a need for a mount that is lighter in weight, improves durability and reduces both initial and high mileage noise, vibration, and harshness between a sub-frame and a body.

SUMMARY

Accordingly, the present disclosure provides a mount assembly for mounting a support structure to a vehicle body, such as a frame, sub-frame or vehicle cradle mount. The mount assembly includes an insert including a generally cylindrical body having an aperture extending therethrough and a first pair of radial projections and a second pair of radial projections. The first pair of radial projections extend at a distance greater than the second pair of radial projections. A microcellular urethane body is press-fit over the insert in order to pre-compress the body. A cup member surrounds a portion of the microcellular urethane body.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 1 is a cross-sectional view of the body mount assembly according to the principles of the present disclosure;

FIG. 2 is a perspective view of an insert for use with the body mount assembly according to the principles of the present disclosure;

FIG. 3 is a top plan view of the insert of FIG. 2;

FIG. 4 is a cross-sectional view of the insert taken along line 4-4 of FIG. 3;

FIG. 9 is a cross-sectional view of the cup of FIG. 8;

FIG. 10 is a cross-sectional view of a body mount assembly according to a second embodiment of the present disclosure;

FIG. 11 is a perspective view of an insert utilized with the body mount assembly shown in FIG. 10;

FIG. 12 is a top plan view of the insert of FIG. 11;

FIG. 13 is a cross-sectional view taken along line 13-13 of FIG. 12;

FIG. 22 is a perspective view of an alternative cup member according to the principles of the present disclosure.

DETAILED DESCRIPTION

Figure 5:
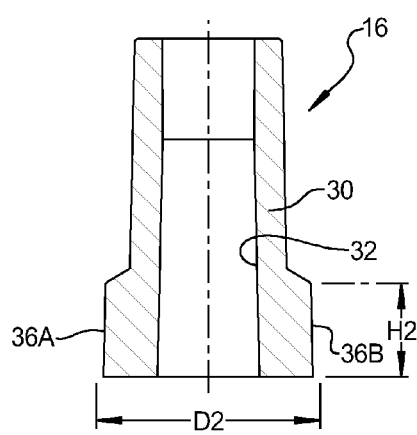
FIG. 5 is a cross-sectional view of the insert taken along line 5-5 of FIG. 3.

The following description is merely exemplary in nature and is not intended to limit the present disclosure, application, or uses. It should be understood that throughout the drawings, corresponding reference numerals indicate like or corresponding parts and features.

With reference to FIG. 1, a vehicle body mount assembly 10, according to the principles of the present disclosure, will now be described. The body mount assembly 10 is provided for connecting a support structure, such as a frame, vehicle cradle mount, or subframe 14, to a vehicle body 12. The body mount assembly 10 includes an insert 16 received in a micro-cellular urethane body member 18 which is partially surrounded by a cup member 20. A fastener 22 engages a plate member 24 which is disposed against a lower end of the micro-cellular urethane body 18. A nut 26 and washer 28 are provided for securing the support structure 14 to the body 12.

With reference to FIGS. 2-5, the insert 16 will now be described. The insert 16 includes a generally cylindrical body portion 30 having an aperture 32 extending therethrough. The body portion 30 includes a first pair of radial projections 34A, 34B and a second pair of radial projections 36A, 36B which are offset from the first pair of radial projections 34A, 34B by 90 degrees. As shown in FIGS. 2, 4, and 5, the first pair of radial projections 34A, 34B are taller in height than the second pair of radial projections 36A, 36B. Furthermore, the first pair of radial projections 34A, 34B have a maximum diameter D1 which is greater than a maximum diameter D2 of the second pair of radial projections 36A, 36B. Each of the radial projections 34A, 34B have a height H1, and the second pair of radial projections 36A, 36B have a height H2. It should be understood that the diameters D1, D2 and heights H1, H2 of the radial projections can be varied according to the desired design parameters.

Figure 6:
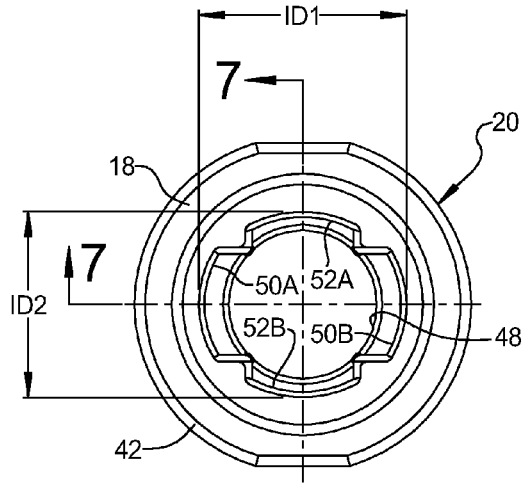
FIG. 6 is a bottom plan view of a micro-cellular urethane body and cup assembly for use with the mount of FIG. 1.
Figure 7:
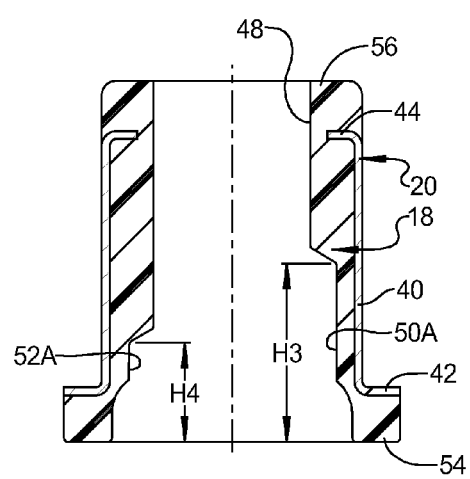
FIG. 7 is a cross-sectional view taken along line 7-7 of FIG. 6.
Figure 8:
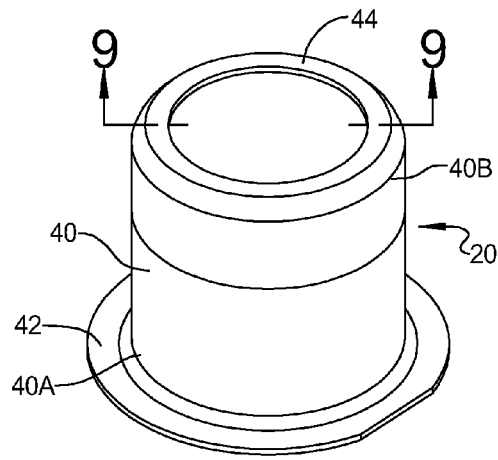
FIG. 8 is a perspective view of the cup utilized with the mount assembly shown in FIG. 1.
Figure 14:
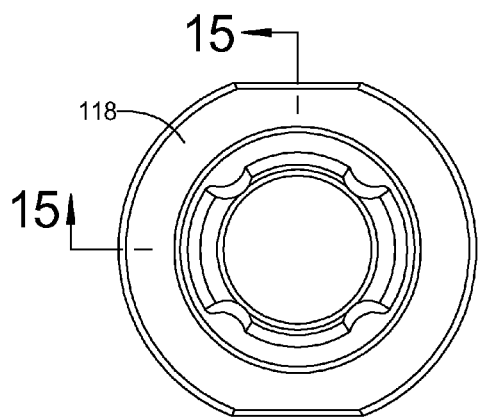
FIG. 14 is a bottom view of a micro-cellular urethane body and cup assembly for use with the body mount assembly of FIG. 10.
Figure 15:
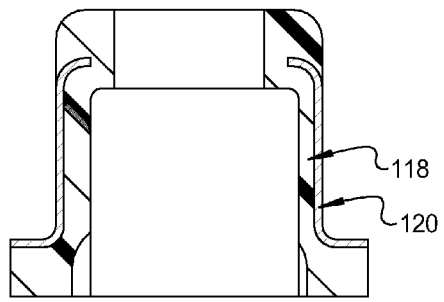
FIG. 15 is a cross-sectional view taken along line 15-15 of FIG. 14.
Figure 16:
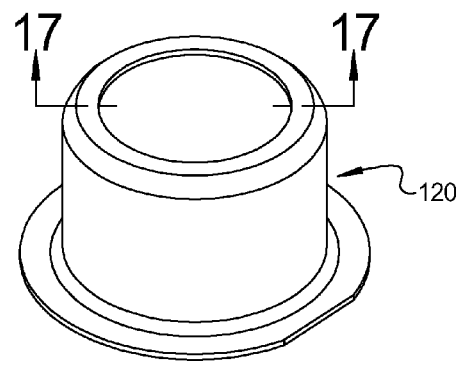
FIG. 16 is a perspective view of a cup member utilized with the body mount assembly of FIG. 10.
Figure 17:
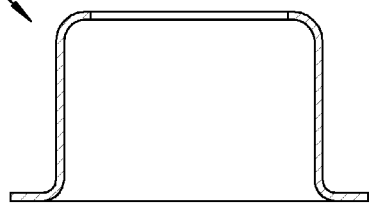
FIG. 17 is a cross-sectional view of the cup member of FIG. 16.

With reference to FIGS. 6 and 7, the micro-cellular urethane body 18 and cup 20 assembly will now be described. The cup member 20 has a cylindrical body 40 having a first end 40A provided with a radially outwardly extending flange 42 and a second end 40B provided with a radially inwardly extending flange 44. The micro-cellular urethane body 18 is overmolded to the cup 20 and includes an aperture 48 extending axially therethrough wherein the aperture 48 is provided with a first pair of oppositely disposed recesses 50A, 50B and a second pair of oppositely disposed recesses 52A, 52B offset 90 degrees from the first pair of recesses 50A, 50B. The first pair of recesses 50A, 50B have a height H3, and the second pair of recesses 52A, 52B have a height H4 which is less than the height H3. The first pair of recesses 50A, 50B have a maximum inside diameter ID1 and the second pair of recesses 52A, 52B have a maximum inside diameter ID2 which is smaller than ID1.

The micro-cellular urethane body 18 extends axially beyond the flange portion 42 of cup member 20 and extends radially outward so as to cover at least a portion of the face of the radially outwardly extending flange portion 42. A second portion 56 of the micro-cellular polyurethane member 18 extends axially beyond the radially inwardly extending flange portion 44 of the cup member 20 so as to surround at least a portion of the radially inwardly extending flange portion 44. The axially extending micro-cellular urethane portion 56 is disposed against the body member 12, while the axially extending micro-cellular urethane portion 54 is disposed against the flat plate 24 between the support structure 14 and plate 24.

The insert 16 is press-fit within the micro-cellular urethane body 18 such that the diameter of the first pair of radial projections 34A, 34B is larger than the inside diameter ID1 of the first pair of recesses 50A, 50B of the micro-cellular urethane body member 18. Similarly, the diameter D2 of the second pair of radial projections 36A, 36B is greater than the inside diameter ID2 of the second pair of recesses 52A, 52B provided in the micro-cellular urethane body member 18. Accordingly, the urethane body member is pre-compressed upon insertion of the insert 16 into the micro-cellular urethane body member 18 and cup assembly 20. The amount of pre-compression of the micro-cellular urethane body member can be determined based upon design parameters and can be selected from a range of between 0 and 50 percent compression relative to the original uncompressed wall thickness dimension. A pre-compression amount of at least 10 percent is desirable in many applications. The amount of pre-compression increases the stiffness of the micro-cellular urethane body member 18 so as to provide desired characteristics in both the lateral and fore and aft directions. The height H1, H2, H3, H4 can also be selected in order to selectively tune the height of micro-cellular urethane that is being pre-compressed. The body mount assembly of the present invention has been shown to provide high damping in the low frequency range and low damping in a high frequency range as is desired for optimal NVH conditions.

With reference to FIGS. 10-17, wherein like reference numerals are utilized with the added prefix 1 in order to designate common or similar elements to those described above, a second embodiment of the body mount assembly 110 will now be described. The body mount assembly 110 has a shorter height than the body mount assembly 10, but utilizes an insert 116, a micro-cellular urethane body member 118, and a cup member 120 in a similar manner as described above. The insert 116 is shown including a first pair of radially extending projections 134A, 134B and a second pair of radial projections 136A, 136B that are each provided with the same height, with the radial projections 134A, 134B having a greater diameter than the diameter of the radial projections 136A, 136B. Other than that difference, the function and operation of the body mount assembly 110 is substantially the same as the body mount assembly 10, as described above. Accordingly, a detailed description of the structure and function of the second embodiment of the body mount assembly 110 will not be provided.

With reference to FIGS. 18-21, a still further embodiment of the body mount assembly 210 will now be described. The body mount assembly 210 is provided for mounting the vehicle body 12 to a support structure 14 similarly to the previously described body mount assemblies 10, 110. The body mount assembly 210 includes an insert 216 surrounded by an overmold micro-cellular urethane body member 218. The insert 216 and over-molded micro-cellular urethane body member 218 are inserted into a cylindrical aperture 220 provided in the vehicle support structure 14. A plate member 222 is provided between the body 12 and an upper portion of the insert 216, and includes axially extending flange portion 222A which is disposed against a separate micro-cellular urethane ring 224 which is also disposed against the support structure 14.

Figure 18:
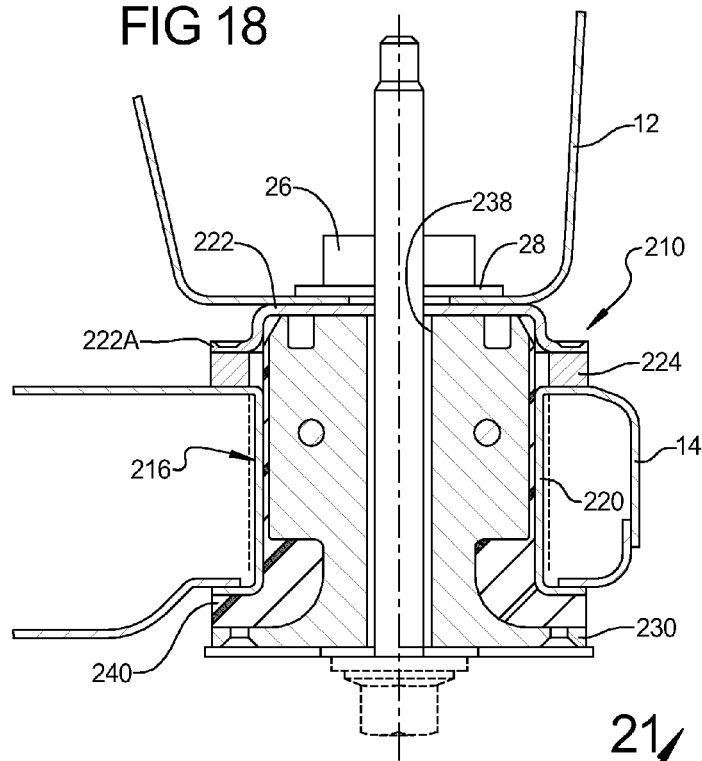
FIG. 18 is a cross-sectional view of a body mount assembly according to a third embodiment of the present disclosure.
Figure 19:
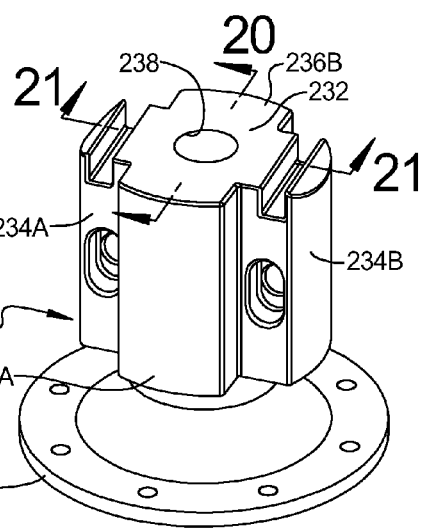
FIG. 19 is a perspective view of an insert for use with the body mount assembly of FIG. 18.
Figure 20:
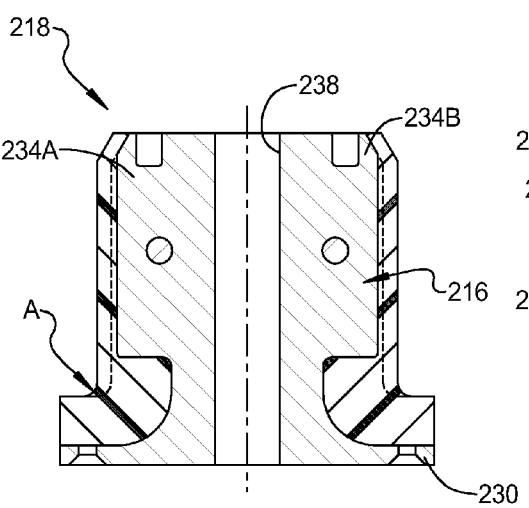
FIG. 20 is a cross-sectional view of the body mount assembly according to the principles of the present disclosure.
Figure 21:
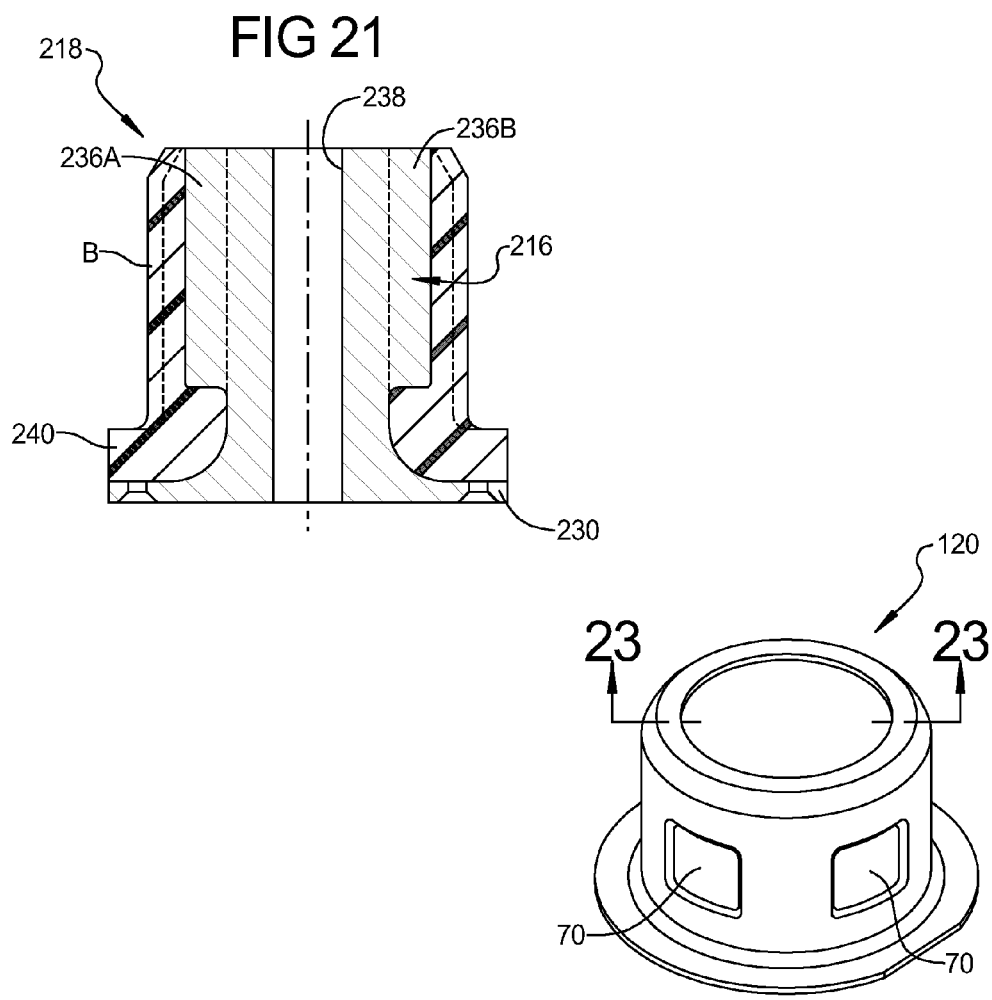
FIG. 21 is a second cross-sectional view of the body mount assembly of FIG. 18.

As shown in FIG. 19, the insert 216 includes a radially extending flange base portion 230, an axially extending post portion 232 that includes a first pair of radially extending projections 234A, 234B, and a second pair of radial projections 236A, 236B extending transverse to the first pair of radial projections 234A, 234B. An aperture 238 extends axially through the insert 216. The micro-cellular urethane body member 218 is over molded around the insert 216 to provide a generally cylindrical outer surface surrounding the insert 216. A radially extending flange portion 240 of the micro-cellular urethane 218 extends outward over the flange 230 of the insert 216. In the assembled condition, as illustrated in FIG. 18, the micro-cellular urethane body member 218 is compressed from its original state, as illustrated in FIGS. 20 and 21, to a pre-compressed state, as illustrated by phantom lines A and B, as shown in FIGS. 20 and 21, respectively. As illustrated in FIG. 20, due to the wider diameter of the radially extending projections 234A, 234B as compared to the narrower diameter of the second pair of radial projections 236A, 236B, the micro-cellular urethane body member is pre-compressed to a greater extent, as shown in FIG. 20, than it is pre-compressed in the transverse direction, as shown in FIG. 21.

It should be noted that the relative direction in the fore, aft, and lateral directions can be specifically tuned to provide the desired NVH characteristics for a specific application. In addition, the assembly of the body mounts 10, 110, 210 also can provide pre-compression in the vertical direction via the tightening of the nut on the fastener 22 so as to pre-compress the axially extending portions 54, 56 of the body mount 10, 110, or to compress the radially extending portion 240 and secondary ring 224 in the vertical direction. Thus, the body mount assemblies 10, 110, 210, according to the principles of the present disclosure, are capable of providing lateral, fore, aft, and vertical NVH control with a simple light-weight construction. As described above, the amount of pre-compression can be selected in order to provide desired performance characteristics. In one exemplary embodiment, the amount of pre-compression in a first direction, either lateral or fore and aft, can preferably be approximately 25 percent of the wall's uncompressed thickness, while in the other transverse direction, the pre-compression can be approximately 33 percent.

Figure 23:
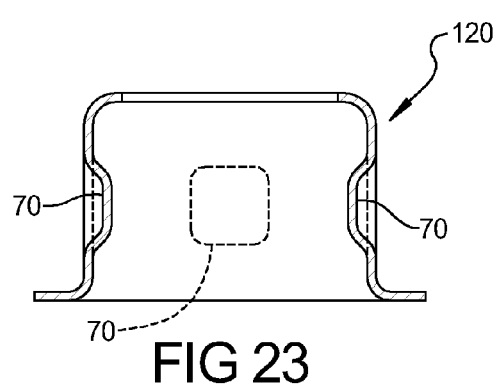
FIG. 23 is a cross-sectional view of the cup member shown in FIG. 22.

In addition, in order to provide precision tuning of the body mount assemblies 10, 110, 210, the body mount assemblies 10, 110, 210 can be tested for their vibration characteristics, and when deviating from desired characteristics, the cup members 20, 120, 220 can be selectively indented, as illustrated in FIGS. 22 and 23, to provide further precompression of the mirocellular urethane body 18, 118, 218 to precision tune the mount assembly for desired characteristics. The diameter and depth of the indentations 70 can be selected to provide the desired adjustments to obtain the desired characteristics. The use of indentation 70 to provide desired vibration damping characteristics can be used with or without pre-compression of the microcellular urethane body. In other words, the microcellular urethane body can be press-fit, simply inserted, or molded in place prior to the indentations 70 being formed in the cup member in order to achieve the desired characteristics. After the body mount is assembled, the vibration characteristics can be tested and compared to desired characteristics. If the vibration characteristics do not meet the desired characteristics, then the cup member can be selectively indented to adjust the vibration characteristics by compressing/or further compressing the microcellular urethane body.

What is claimed is:

1. A mount assembly comprising:
   an insert including a generally cylindrical body having an aperture extending therethrough and a first pair of radial projections and a second pair of radial projections, said first pair of radial projections extending at a distance greater than said second pair of radial projections;
   a microcellular urethane body disposed over said insert; and
   a cup member surrounding a portion of said microcellular urethane body.

2. The mount assembly according to claim 1, wherein said microcellular urethane body includes an aperture therethrough and having first and second pairs of recesses corresponding to said first and second pairs of radial projections of said insert, wherein said microcellular urethane body substantially fills an entire space between said insert and said cup member.

3. The mount assembly according to claim 2, wherein said first pair of recesses have an inside diameter smaller than an outside diameter of said first pair of radial projections, whereby insertion of said insert into said microcellular urethane body causes said microcellular urethane body to be pre-compressed a pre-determined amount.

4. The mount assembly according to claim 3, wherein said micro-cellular urethane body is pre-compressed at least 10% from its original wall thickness.

5. The mount assembly according to claim 3, wherein said second pair of recesses have an inside diameter smaller than an outside diameter of said second pair of radial projections, whereby insertion of said insert into said microcellular urethane body causes said microcellular urethane body to be pre-compressed a pre-determined amount.

6. The mount assembly according to claim 5, wherein said micro-cellular urethane body is pre-compressed at least 10% from its original wall thickness.

7. The mount assembly according to claim 1, wherein said cup member includes a first end having a radially outwardly extending flange, wherein said microcellular urethane body extends axially beyond said first end of said cup member and radially outwardly over a portion of said radially outwardly extending flange.

8. The mount assembly according to claim 1, wherein said cup member includes an end having a radially inwardly extending flange, wherein said microcellular urethane body extends beyond said end of said cup member so as to surround a portion of said radially inwardly extending flange.

9. The mount assembly according to claim 1, wherein said cup member is selectively indented to provide desired vibration damping characteristics.

10. A mount assembly comprising:
    an insert including a body having an aperture extending therethrough, said insert having a wider diameter in a first direction and a narrower diameter in a transverse direction to said first direction;
    a microcellular urethane body press-fit over said insert; and
    a cup member surrounding a portion of said microcellular urethane body.

11. The mount assembly according to claim 10, wherein said cup member includes a first end having a radially outwardly extending flange, wherein said microcellular urethane body extends axially beyond said first end of said cup member and radially outwardly over a portion of said radially outwardly extending flange.

12. The mount assembly according to claim 10, wherein said cup member includes an end having a radially inwardly extending flange, wherein said microcellular urethane body extends beyond said end of said cup member so as to surround a portion of said radially inwardly extending flange.

13. The mount assembly according to claim 10, wherein said cup member is selectively indented to provide desired vibration damping characteristics.

14. A mount assembly comprising:
    an insert including a body having an aperture extending therethrough, said insert having a wider diameter in a first direction and a narrower diameter in a transverse direction to said first direction;
    a microcellular urethane body press-fit over said insert;
    a cup member surrounding a portion of said microcellular urethane body; and wherein said microcellular urethane body substantially fills an entire space between said insert and said cup member and includes an aperture therethrough and having a greater thickness in said transverse direction than in said first direction.

15. The mount assembly according to claim 14, wherein said microcellular urethane body has an inside diameter smaller than an outside diameter of said insert, whereby insertion of said insert into said microcellular urethane body causes said microcellular urethane body to be pre-compressed a pre-determined amount.

16. The mount assembly according to claim 15, wherein said micro-cellular urethane body is pre-compressed at least 10% from its original wall thickness.

17. A mount assembly comprising:
an insert including a body having an aperture extending therethrough;
a microcellular urethane body press-fit over said insert; and
a cup member surrounding a portion of said microcellular urethane body, wherein said microcellular urethane body has an inside diameter smaller than an outside diameter of said insert, whereby insertion of said insert into said microcellular urethane body causes said microcellular urethane body to be pre-compressed a pre-determined amount.

18. A mount assembly comprising:
an insert including a body having an aperture extending therethrough;
a microcellular urethane body press-fit over said insert; and
a cup member surrounding a portion of said microcellular urethane body, wherein said microcellular urethane body has an inside diameter smaller than an outside diameter of said insert, whereby insertion of said insert into said microcellular urethane body causes said microcellular urethane body to be pre-compressed a pre-determined amount;
wherein said micro-cellular urethane body substantially fills an entire space between said insert and said cup member and is pre-compressed at least 10% from its original wall thickness.

* * * * *